E. J. MURPHY.
CONTROL FOR TURRET LATHES AND THE LIKE.
APPLICATION FILED NOV. 7, 1916.
1,269,489.
Patented June 11, 1918.
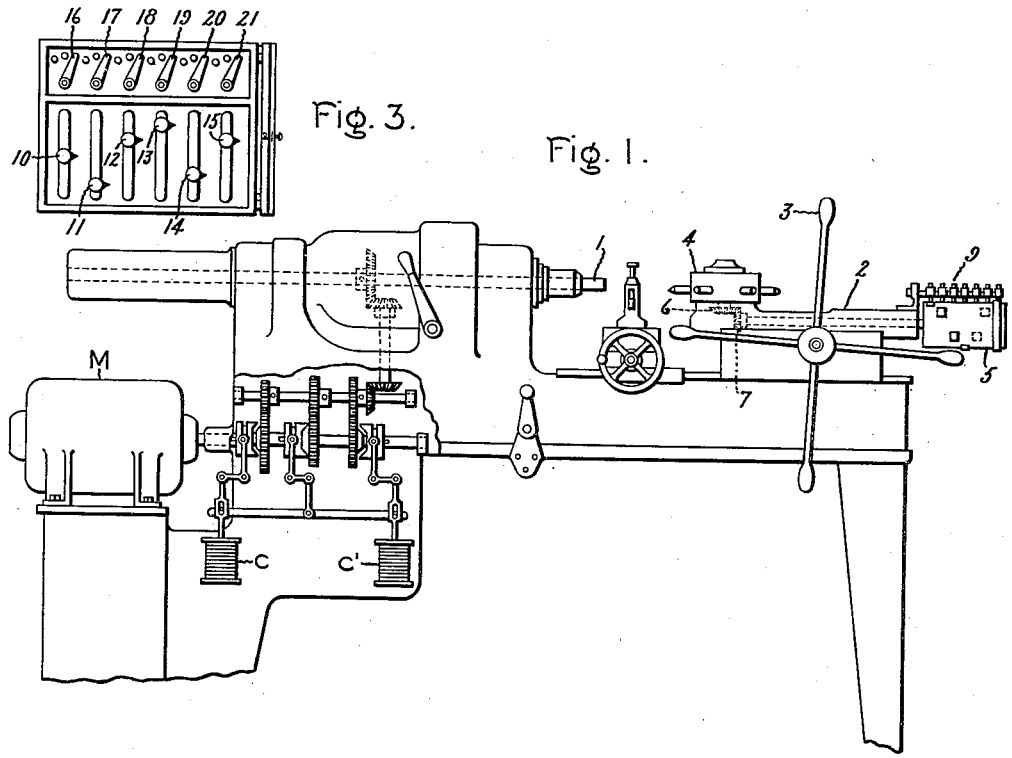
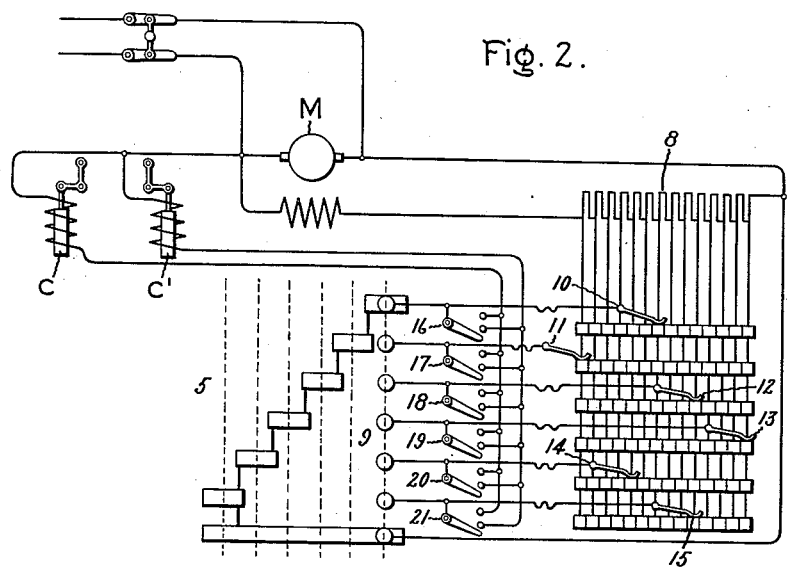
Inventor:
Edwin J. Murphy,
by Albert G. Davis
His Attorney.

UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

CONTROL FOR TURRET-LATHES AND THE LIKE.

1,269,489.         Specification of Letters Patent.     Patented June 11, 1918.

Application filed November 7, 1916. Serial No. 130,070.

*To all whom it may concern:*

Be it known that I, EDWIN J. MURPHY, a citizen of the United States, residing at Schenectady, county of Schenectady, State of New York, have invented certain new and useful Improvements in Controls for Turret-Lathes or the like, of which the following is a specification.

My invention relates to the control of electric motors and has for its object the provision of means whereby the speed of an electric motor may be varied in accordance with the work to be done in a reliable, simple and efficient manner.

My invention relates more specifically to the control of electric motors employed for driving machine tools and the like. In the operation of machine tools such as turret lathes, screw machines, and similar machines, it is very desirable that different speeds be given to the motor to correspond to the different classes of work to be done. For instance, the first operation of a turret lathe may be "drilling," the next "tapping" and the next "facing," etc., each of which requires a different cutting speed from the other. The turret may carry as many as 6 or 7 cutting tools and they may each require a different cutting speed so that there will be 6 or 7 speeds for the motor corresponding to the 6 or 7 different positions of the turret. This has been accomplished heretofore by having a controller which is rotated when the turret is turned so as to vary the motor's speed. In this case each position of the controller corresponds to a definite speed on the motor—that is, there is a definite speed for each tool in the turret. It is desirable, however, for each tool to be given a range of speeds so that when a tool is in working position it may have any required speed. An attempt has been made to accomplish this by the use of cams, one for each job, each cam having the proper cam surface to shift the controller the required amount. This involves an unwarranted expense in the making of cams especially in the shops where all kinds of work are done and any machine is liable to be changed from one class of work to another of quite a different character.

One of the objects of my invention is to bring about this variation in speed for each tool without the use of cams or similar devices. In carrying out my invention I provide a controlling member connected to a resistance and operated with the turret so that in each position of the turret the controller occupies a corresponding position. Between the controller member and the resistance I provide an adjusting device for varying the resistance which will be in circuit in each position of the controller. This will preferably comprise a plurality of movable members one for each position of the controller, the arrangement being such that each member may be moved independently of the other, independently of the controller and independently of the lathe to vary the amount of resistance affected by the controller, thereby giving a wide range of speed for each position of the turret.

In order to obtain a still greater range of speed in certain of the positions of the turret, I further provide a plurality of electromagnetically actuated clutches operated in accordance with the movement of the controlling member to change the ratio of speeds between the motor and the work spindle as desired.

For a better understanding of my invention reference is had to the following description taken in connection with the accompanying drawing. Referring to the drawing illustrating one embodiment of my invention, Figure 1 shows a motor driven turret lathe. Fig. 2 shows a diagram of connections for the driving motor of the lathe and Fig. 3 is a view showing the motor speed controlling rheostat box with the cover opened to show the adjusting devices for varying the resistance which it is desired shall be in circuit and the corresponding control switches for gear changing clutches.

Referring to Fig. 1 the driving motor M is connected to the work spindle 1 by means of gearing or the like and is adapted to rotate the work spindle at the proper speed depending upon the character of operation to be performed on the work which is supported and rotated by the work spindle. The turret slide 2 is moved horizontally along the bed of the lathe by means of the handle 3 operating through gearing (not shown), and the turret 4 which supports in proper position the various tools is connected by means of gearing (not shown) so that when the turret is moved horizontally to the right after having completed one of the required operations on the work, the turret 4 is rotated in a horizontal plane a proper amount to bring the next tool in proper alinement with the work holder and the work as the turret slide approaches the end of its travel.

A drum controller 5 having a number of operative positions corresponding to the number of tools in the turret is connected to and rotated synchronously with the turret 4 by means of the bevel gears 6, 7 to vary the speed of the motor and the work spindle as the turret is turned. The controller is adapted to vary a resistance 8 in the shunt field of the motor and also operate the electromagnetic clutches C and C' to provide for the desired speed of the work spindle for each tool in the turret. The electromagnetic clutches C and C' are shown merely for the purpose of illustration, and it is to be understood that any suitable means for changing the ratio of speed between the driving motor and the work spindle may be used. In case it is desired that other gear ratios be obtained, other electromagnetic clutches can be furnished, each of the clutches providing for a different speed ratio than the others; thus, one may give a ratio of 4:1, another, a ratio of 2:1, another a ratio of 3:1 and so on. Electrically connected contact segments, one for each operative position of the controller, are provided on the rotating part of the drum controller and are adapted to respectively engage stationary contacts 9 to vary the resistance in the motor field. Connected to these stationary contacts between the shunt field resistance and the stationary contacts are the independent adjustable contact devices 10, 11, 12, 13, 14 and 15 which are provided for varying the speed of the motor at each position of the controller corresponding to a position of the turret. These contact devices are independent of each other and they can be moved independently of the controller and the lathe itself. Each of these adjustable contacts slides over its respective commutator made up of a number of metallic sections insulated from each other. Corresponding metallic sections of all the commutators are electrically connected to each other and to the shunt field resistance so as to include a portion of the resistance between adjacent sections, the arrangement being such that the amount of resistance in the shunt field which is short circuited by the contacts of the controller 5 at each operative position of the turret is increased as the adjustable contacts are moved to the left as shown in Fig. 2. By shifting these adjustable contact devices on their respective commutators, the speed of the motor at each operative position of the turret and the amount of speed change from one position of the turret to the next may be independently varied at will while the machine is running without having to shut down and change any cams or the like. The number of the sections in these commutators and the amount of shunt field resistance between adjacent sections may be varied as desired to accommodate the control of the lathe to the paricular driving motor being used.

Electrically connected to the stationary contacts 9 of the controlling member are the manually operated switches 16, 17, 18, 19, 20 and 21 which are adapted to control the winding of either one of the electromagnetic gear changing clutches C and C', the arrangement being such that when these switches are closed at either one of their respective contacts, the controller 5 will not only affect the resistance 8 in the shunt field of the motor, but also energize the magnets of either one of the clutches C or C' to change the gear ratio between the driving motor M and work spindle 1, thereby providing a much greater range of speed control than would be practically possible by means of the motor field control alone, at the same time retaining the advantage of being able to vary the amount of change in speed of the work spindle as the turret is turned, independently of the machine and while it is running.

The operation of my device is as follows:
With the motor M running and a piece of of work in the work holder 1, the handle 3 is turned so as to bring the desired tool in the turret 4 into operative engagement with the work. The speed at which the work holder 1 is rotated is determined by adjusting the proper one of the speed varying contacts 10, 11, 12, 13, 14, or 15 for the particular tool in the turret and closing the proper one of the switches 16, 17, 18, 19, 20 or 21 to energize either of the clutches C or C' if it is desired that the gear ratio be also changed at this position of the controller. After this tool has completed its operation the handle 3 is rotated so as to move the tool to the right out of engagement with the work. As the turret slide approaches the end of its travel, the turret is rotated so as to bring the next tool in succession into alinement with the work spindle and the work. At the same time the drum controller 5 is rotated a corresponding distance to bring the next successive segment into engagement with its corresponding stationary contact and the speed of the motor is accordingly automatically varied to suit this particular tool because of the altered resistance in the motor field, and the change in gear ratio provided the other clutch is energized. After this tool has performed its operation, the turret slide is retracted and the next tool is brought into alinement with the work, the speed of the motor changed, and so on through the successive operations to be performed. With the adjustable contact devices positioned on their respective commutators, the controller 5 in the position shown in Fig. 2 and the switches 16 to 21 inclusive all open, the motor will first be operated at a speed corresponding to half the speed change possible by the use of the resistance 8; at the next position the motor will be operated at the lowest speed with all the resistance in the motor field short circuited; next at approximately two thirds the speed change; next at the highest speed with all the resistance included in the shunt field; next at approximately one-third the speed change, and finally at the same speed as the third position of the controller.

If however it is desired that the work holder shall have a speed which is beyond the range of that obtained by means of the shunt field control, the proper one of the switches 16 to 21 corresponding to the tool in the turret for which this speed is desired, is closed at the proper one of its contacts so that either one of the electromagnetic gear changing clutches will be energized at the same time that the resistance in the shunt field of the motor is affected by the controller 5.

Suppose, for instance, that the speed of the work spindle at the 4th position is not sufficiently high and it is desired to increase this speed considerably in order to accommodate the speed of the work spindle to the character of the work which is to be performed. To do this it will be necessary to effect the change in the ratio of the speeds between the driving motor shaft and the work spindle as well as to vary the field resistance. Suppose, for purposes of illustration, that the driving motor has a full field speed of 400 R. P. M. and a maximum permissible speed of 1600 R. P. M. with the resistance 8 all included in the shunt field circuit, and that the work spindle is ordinarily driven at the same speed as the driving motor shaft when the gear ratio between the motor shaft and the work spindle is not changed by the electromagnetic clutches. Suppose that the clutch C effects a 1:2 ratio between the motor shaft and the work spindle and that it is desired that the work spindle be rotated at 2000 R. P. M. To effect this, the control switch 19 is closed on its upper contact as shown on Fig. 2 and the adjustable contact 13 is moved to the left. Then when the controller 5 is moved to the 4th position in response to the movement of the turret, the controller will automatically effect the change in the spindle speed as determined by the gear ratio change due to the energization of the magnet of clutch C, and the amount of shunt field resistance in circuit determined by the position of the adjustable contact 13. The speed of the spindle may then be varied between the limits of 800 and 3200 R. P. M. The variation between these limits is effected while the machine is running by simply sliding the adjustable contact 13 to the position on its commutator at which the desired speed of approximately 2000 R. P. M. is obtained. The speed of the work spindle may likewise be changed at some or all of the other positions of the turret, and a different gear ratio may be had at some of the positions than at others, depending on whether or not the motor drives the spindle directly or through the interposition of either set of speed changing gears. It will thus be seen that my arrangement has the great advantage that it makes possible the independent variation of the speed of the motor and the speed of the work spindle for each tool in the turret, and this variation in speed may be made while the lathe is in operation without having to shut down and change any cams or the like.

The motor speed controlling rheostat box shown in Fig. 3 may be placed at any desired position about the lathe and is connected between the stationary contacts of the drum controller and the motor field. The adjusting devices 10, 11, 12, 13, 14 and 15 are preferably provided with insulated handles and with indexes so that the motor may be run at the desired speed in accordance with a scale of motor speeds placed along the path of travel of each adjusting device. Directly above the adjusting devices 10 to 15 inclusive are the switches 16 to 21 respectively which control the magnet circuits of the electromagnetic gear changing clutches, the arrangement being such as to avoid any confusion on the part of the operator in selecting the proper adjusting devices and the proper switches for effecting the gear changes. This box is preferably provided with a lock in order that the foreman may when desired set the adjusting devices for the proper succession of motor speeds and then lock the box so that the lathe operator is compelled to operate his lathe at the proper speed for each successive operation as predetermined.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means without departing from the spirit of my invention the scope of which is set forth in the annexed claims.

What I claim as new and desire to secure by Letters Patent of the United States is:

1. The combination with a turret lathe or the like having a manually operated turret and an electric motor for driving the lathe, of means for automatically changing the motor from one speed to another as the turret is turned and means for varying the amount of each change independently of the other and of the machine.

2. The combination with a turret lathe or the like having a manually operated turret and an electric motor for driving the lathe, of a resistance for the motor circuit, connections whereby different portions of the resistance shall be included in the circuit as the turret is turned and means for predetermining the said portions independently of the movement of the machine.

3. The combination with a turret lathe or the like, and an electric motor for driving the same, of means for automatically changing the speed of the motor as the turret is turned comprising resistance for the motor which is changed to change the speed of the motor as the turret is turned, and means whereby the connections of said resistance may be shifted to vary the amount of change in speed.

4. The combination with a turret lathe or the like and an electric motor for driving the same, of means for automatically changing the speed of the motor as the turret is turned comprising resistance and a controller for said resistance operated by the turret, and means whereby the connections between the resistance and controller may be varied at will so as to vary the amount of change of speed.

5. The combination with a turret lathe or the like and an electric motor for driving the same, of means for automatically changing the speed of the motor as the turret is turned comprising a resistance and a controller for said resistance operated by the turret, and means independent of the controller for varying the amount of resistance affected by the controller.

6. The combination with a turret lathe or the like and an electric motor for driving the same, of means for automatically changing the speed of the motor as the turret is turned and a varying element for each speed change movable at will to vary the amount of change of speed.

7. The combination with a turret lathe or the like and an electric motor for driving the same, of means for automatically changing the speed of the motor as the turret is turned comprising a resistance, a controller for said resistance operated by the turret, and adjusting devices for varying at will the amount of the resistance affected by the controller.

8. The combination with a turret lathe or the like and an electric motor for driving the same, of means for automatically changing the speed of the motor as the turret is turned comprising a resistance, a controller for said resistance operated by the turret, and an independent movable adjusting device for each position of the turret for varying at will the amount of resistance affected by the controller.

9. The combination with a turret lathe or the like and an electric motor for driving the same, of means for automatically changing the speed of the motor as the turret is turned comprising a resistance, a controller for said resistance operated by the turret, and a plurality of independent adjusting devices independent of the controller and the lathe for varying at will the amount of resistance affected by the controller.

10. The combination with a turret lathe or the like and an electric motor for driving the same, of means for automatically changing the speed of the motor as the turret is turned comprising a resistance in the motor shunt field circuit, a controller operated by the turret for short circuiting a part or all of the resistance, and means whereby the amount of the resistance short circuited by the controller may be varied while the motor is running.

11. The combination with a turret lathe or the like and an electric motor for driving the same, of means for automatically changing the speed of the motor as the turret is turned comprising a resistance, a controller for the resistance operated by the turret, and adjusting devices for varying the amount of the resistance affected by the controller at each operative position independently of the amount affected at other positions of the controller.

12. The combination with a turret lathe or the like and an electric motor for driving the same, of means for automatically changing the speed of the motor as the turret is turned, comprising a resistance, a controller for said resistance moved in accordance with the movement of the turret, a plurality of commutators connected to the resistance, and adjusting devices connecting the commutators and the controller for varying at will the amount of resistance affected at each position of the controller.

13. Means for varying the speed of the electric driving motor of a turret lathe or the like as the turret is turned, comprising a resistance for the motor, a controller having an operative position for each position of the turret operated in accordance with the movement of the turret to vary the resistance, a plurality of commutators each of which has a plurality of insulated sections connected to the resistance, and means for varying at will the connections of the controller to the commutators to vary the amount of resistance affected by the controller at each operative position.

14. The combination with a turret lathe or the like and an electric motor for driving the same, of means for automatically changing the speed of the motor as the turret is turned comprising a resistance for the motor, a controller operated by the turret for short circuiting a part or all of the resistance at each operative position of the turret, a plurality of commutators each of which has a plurality of sections connected to corresponding sections of the other commutators and to the resistance so as to include a portion of the resistance between adjacent sections of each commutator, and means independent of the controller for varying at will the connections of the controller to the commutators so as to vary the amount of resistance affected by the controller at each operative position of the turret.

15. The combination with a turret lathe or the like and an electric motor for driving the same, of means for automatically changing the speed of the lathe as the turret is turned, comprising means for changing the speed of the motor and the ratio of speeds between the motor and the work spindle, and means whereby the amount of change of speed of the motor may be varied while the machine is running.

16. The combination with a turret lathe or the like and an electric motor for driving the same, of means for automatically changing the speed of the lathe as the turret is turned, comprising a resistance for the motor and means for varying the ratio of speeds between the driving motor and the work spindle, and means whereby the amount of resistance in the motor circuit and the ratio of speeds between the driving motor and the work spindle may be varied at will by shifting electrical connections.

17. The combination with a turret lathe or the like and an electric motor for driving the same, of means for automatically changing the speed of the motor as the turret is turned comprising resistance for the motor, a speed changing clutch, a controller for said resistance and said speed changing clutch operated by the turret, and means whereby the connections between the resistance, the speed changing clutch and the controller may be varied at will so as to vary the amount of change of speed.

18. The combination with a turret lathe or the like and an electric motor for driving the same, of means for automatically changing the speed of the lathe as the turret is turned, comprising a resistance for the motor and a plurality of electromagnetically actuated clutches for changing the ratio of speeds between the motor and the work spindle, a controller operated by the turret for said resistance and said electromagnetically actuated clutches, and a plurality of independent contact devices for each position of the controller for selectively actuating the electromagnetic clutches and varying at will the amount of resistance affected by the controller.

19. The combination with a turret lathe or the like and an electric motor for driving the same, of means for automatically changing the speed of the lathe as the turret is turned, comprising a resistance for the motor and an electromagnetically actuated clutch for varying the ratio of speeds between the motor and the work spindle, and means for varying the amount of the resistance affected by the controller and the energization of the electromagnetic clutch at each operative position of the turret independently of the amount of resistance affected and the ratio of speeds between the driving motor and the work spindle at other positions of the controller.

20. The combination with a turret lathe or the like and an electric motor for driving the same, of means for automatically varying the speed of the lathe as the turret is turned, comprising a resistance for the motor and an electromagnetically actuated speed changing clutch for varying the ratio of speeds between the driving motor and the work spindle, a controller having an operative position for each position of the turret operated by the turret to vary the resistance and energize the clutch magnet, a plurality of commutators each of which has a plurality of insulated sections connected to the resistance, and means for varying at will the connections of the controller to the commutator and the clutch magnet to vary the amount of resistance affected by the controller and the operation of the clutch at each operative position of the turret.

Sworn to and subscribed before me this 6th day of November 1916.

EDWIN J. MURPHY.